Oct. 10, 1961  A. E. FRIEDMAN  3,003,833
STAMPED THRUST COLLAR
Filed Oct. 22, 1959
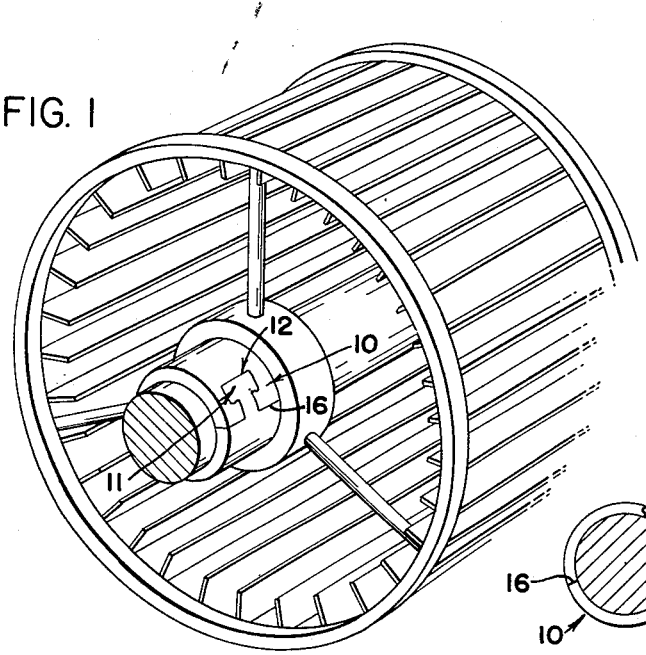
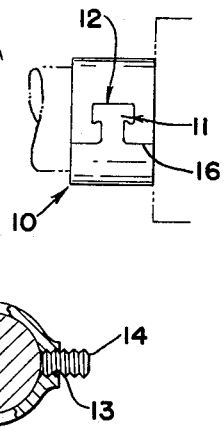
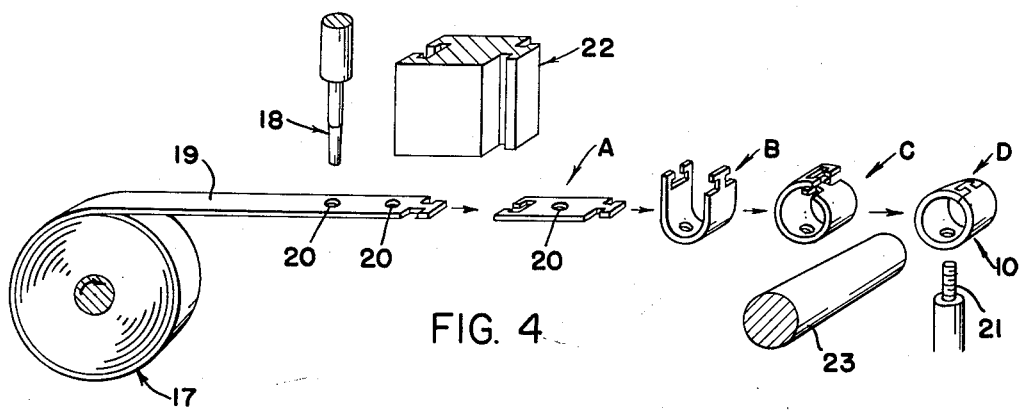
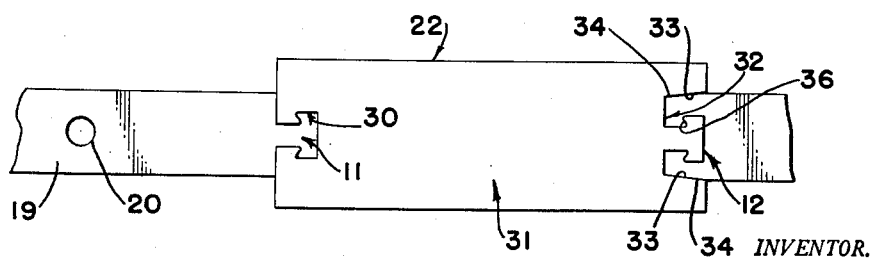
INVENTOR.
ARTHUR E. FRIEDMAN
BY
*Fay & Fay*
ATTORNEYS

United States Patent Office 3,003,833
Patented Oct. 10, 1961

3,003,833
STAMPED THRUST COLLAR
Arthur E. Friedman, Shaker Heights, Ohio, assignor to Air Controls, Inc., Cleveland, Ohio, a corporation of Ohio
Filed Oct. 22, 1959, Ser. No. 848,042
3 Claims. (Cl. 308—163)

This invention, relating as indicated to a stamped thrust collar, is particularly directed to a novel type of thrust collar that is formed of stamped components and assembled on a continuous basis in a new combination.

In general in connection with thrust collars, it is known that they are used on fans and a number of other assemblies for attachment to a shaft in order to hold the members in axial placement, and generally consist of a machined component or tubular stock cut to required length having a punched and tapped hole in the wall and fastened as by means of screws to a shaft.

This invention relates to a stamped member made out of coil stock which is punched for the screw member and subsequently attached to the shaft and formed together in a stamped and clinched ending providing for circumferential tension caused in the collar by the radial thrust acting upon the shaft.

In general the item is formed from coil stock in a series of slides and a multi-slide press. At one station it is punched and tapped for the Allenhead screw, or other such means. A slide forms the opposite ends of the circumferentially formed and wrapped thrust collar by die cutting in one member a tongue with a groove in the opposite member, said tongue and groove not being identical but rather having a narrower width to the groove. The members are coiled upon a mandrel with overlapping ends which are then punched together in a final closing die and expanded into position in a tight fit so that they may not be removed radially and will withstand substantial tension circumferentially.

An object of this invention is to provide a new and improved thrust collar having improved operational characteristics.

A further object of this invention is to develop a new and improved thrust collar having improved characteristics that may be attached to a shaft and withstand the circumferential tension caused by its attachment by means of pressure radially on the shaft without any amount of unbalance being provided in an assembly wherein the dynamics of the unit are important because thrust collars are generally on rotative assemblies and wherein balance in the thrust collar is an important feature.

A still further object of this invention is to provide a new and improved stamped thrust collar in which the tongue and groove overlap and are inserted one in the other and then clinched and formed together, and in which the groove member has a mating part for the tongue. The overall width of the tongue is reduced to withstand clinching but is not out of line or of greater width at the junction of the tongue and groove.

To the accomplishment of the foregoing and related ends, said invention, then, consists of the means hereinafter fully described and particularly pointed out in the claims; the following description setting forth in detail one approved method of carrying out the invention, such disclosed method, however, constituting but one of the various ways in which the principles of the invention may be used.

In the drawings:

FIG. 1 is a perspective view of my new and improved thrust collar in operational position;

FIG. 2 is an elevational view showing the junction of the tongue and groove in the stamped thrust collar;

FIG. 3 is a side view axially of the thrust collar showing the relationship of the screw and the tongue and groove section;

FIG. 4 is a schematic view of the method of assembling the thrust collar; and

FIG. 5 is a detailed view of the die section for forming the tongue and groove in the strip.

Referring more particularly to the drawings, the thrust collar in FIG. 1 is shown at 10 having a tongue section 11 and a groove member 12 which are on opposite ends of a stamped section and formed together in overlapping radial position. A punched and tapped hole 13 is shown with a screw, generally a socket head screw, in position on the shaft of a fan at 14.

FIG. 2 shows the details of FIG. 1, 11 being the tongue and 12 being the groove portion of the stamped thrust collar. The junction between the ends is shown at 16 in FIG. 3, and the punched opening at 13 in FIG. 3 with the socket head screw is shown in position at 14. The stamped thrust collar generally is of some axial width, although, of course, the strip may be of any particular width. It is adapted to be inserted on a shaft and securely held in position without too much unbalance even though the fan rotates at high speeds which generally would cause a certain amount of distortion in the unit.

FIG. 4 shows a coil 17 which is generally positioned on its side, although FIG. 4 is a view looking down from above. A punch is shown schematically at 18 and the strip 19 passes down a line having an opening therethrough at 20. A tapped member is shown schematically at 21 which, in turn, will tap the punched opening in the unit.

The die punch is seen in detail in connection with FIG. 5. It has a tongue and groove portion and moves across the strip to cut both ends of the strip, die cutting or die stamping the member for subsequent forming in a mandrel around the slide. The unit is shown at 22, the mandrel at 23 and the formed object at 10 with the tongue and groove section at 11 and 12.

Subsequent to this, the member is plated, if desired, tapped and threaded with a socket head screw.

In general in connection with the forming operation, the strip is wrapped around a mandrel, the ends are formed in a series in a multi-slide die and then reinserted over one another with an axial movement. The sections of the members as formed around the mandrels are shown as A, B, C, and D, "A" being the straight section, "B" being the first forming operation, generally in a U, "C" being an overlapped forming operation, and "D" being the final closing operation of the overlapping tongue and groove portions.

In the final operation the portions specifically shown in connection with FIG. 5 are apparent, and herein the punched hole is shown at 20. The die block 22 in its horizontal operation on the strip which is on the edge actually forms a tongue 30 and spaced therefrom by a short distance 31 is a groove section 32. Generally this is a straight tongue having an overlapping end portion, and it should be noted that there is a slight angled cutback as at 33.

As a result of this, the ends of the grooved strip are tapered as shown at 34 so that in the final closing operation of the radial closing of the tongue and groove, the clinching operation will slightly expand the metal into a tight fit and slightly widen the thrust collar at this point. As there should not be a greater axial width at the clinched stamped portion, this tapering is considered desirable.

The shoulder 36 has an angled cutback conformation with the wider portion of the tongue having substantially straight sides parallel to the edge of the circumferential strip, and the neck of the tongue is similarly formed with the shoulder in the form of an angled member making an acute angle with each of the side portions of the tongue and with the neck of the tongue.

From the foregoing it will be apparent that I have developed a new and improved thrust collar which is capable of being made rapidly in a series of simple stamping operations in large quantities which may then be subsequently treated as by plating, tapping and assembled with a socket head screw, but, in general, the operational technique is as shown. There is very little wastage in the metal in this operation, and a very tight thrust collar is formed which may be subjected by the radial pressure of a socket head screw on a shaft to cause considerable circumferential tension in the member so that the tongue and groove section must be able to withstand this tension and not let the fan or other assembly held in position slip along the shaft. This axial tension in the thrust collar must be transmitted through the tongue and accepted on each of the shoulders without pulling through under vibrational strain.

This design is particularly good in that respect, and it is realized that the proportions herein are important only for the strength involved in each of the thrust collars, each thrust collar further being proportioned to the duty which it must accept. In this operation, however, a stamped member performs a job which previously was a machined product or took a tubular member which was sawed or cut to position and then punched or generally drilled and tapped. Most of the previously known thrust collars were of substantial size although of short axial length in general but required extensive machine operations to manufacture them.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. A split thrust collar formed from strip material having some axial length and a split circumferential collar engaging surface, said thrust collar having a radial aperture through the collar and a tapped opening for a radially engaging screw connection, said split collar formed from strip of substantially equal width throughout and at one end thereof having a portion substantially reduced in width forming a tongue having a first portion of lesser width forming a neck portion and a wider portion outwardly therefrom, the opposite end of said split collar having a groove with substantially mating conformation to that of the tongue, and each of said ends formed together.

2. The split thrust collar of claim 1, in which there is a distinct shoulder portion on the tongue mating with a shoulder on the groove to provide increased circumferential tension.

3. The split thrust collar of claim 2, in which the shoulder has an angled cutback formation with the wider portion of the tongue having substantially straight sides parallel to the edge of the circumferential strip and in which the neck of the tongue is similarly formed, with the shoulder in the form of an angled member making an acute angle with each of the side portions of the tongue and with the neck of the tongue.

References Cited in the file of this patent

UNITED STATES PATENTS

| 2,136,819 | Large | Nov. 15, 1938 |
| 2,419,691 | Shafer | Apr. 29, 1947 |
| 2,762,118 | Shaw et al. | Sept. 11, 1956 |